United States Patent
Cheng et al.

(10) Patent No.: US 6,182,155 B1
(45) Date of Patent: Jan. 30, 2001

(54) UNIFORM ACCESS TO AND INTERCHANGE BETWEEN OBJECTS EMPLOYING A PLURALITY OF ACCESS METHODS

(75) Inventors: Michael Cheng, Austin, TX (US); Brian Ward Thomson, Ontario (CA)

(73) Assignee: International Business Machines Corporation, Armonk, NY (US)

( * ) Notice: Under 35 U.S.C. 154(b), the term of this patent shall be extended for 0 days.

(21) Appl. No.: 09/002,362

(22) Filed: Jan. 2, 1998

(30) Foreign Application Priority Data

May 9, 1997 (CA) .................................................. 2204971

(51) Int. Cl.⁷ ......................................................... G06F 9/00

(52) U.S. Cl. ............................................................. 709/315

(58) Field of Search .................................... 709/300–305, 709/200–253, 310, 315, 316, 330; 395/701–710; 717/1

(56) References Cited

U.S. PATENT DOCUMENTS

| | | | |
|---|---|---|---|
| 5,369,766 | * 11/1994 | Nakano et al. | 709/305 |
| 5,613,148 | * 3/1997 | Bezviner et al. | 709/203 |
| 5,642,511 | * 6/1997 | Chow et al. | 717/1 |
| 5,655,101 | 8/1997 | O'Farrell et al. | 711/148 |
| 5,732,270 | * 3/1998 | Foody et al. | 709/316 |
| 5,862,328 | * 1/1999 | Colyer | 709/203 |
| 5,903,725 | * 5/1999 | Colyer | 709/203 |

OTHER PUBLICATIONS

Noveck, David, Token Module for OSF/1 AD Version 2, OSF Research Institute, pp. 1–32, Jul. 1994.*

Reasoner, S., "Management By Proxy Agent," Wescon Technical Papers, vol. 35, pp. 190–195, Nov. 1991.*

Marc Shapiro, "Structure and Encapsulation in Distributed Systems: The Proxy Principle", Proceeding of the 6th International Conference on Distributed Systems (1986) pp. 199–204.

* cited by examiner

Primary Examiner—Alvin E. Oberley
Assistant Examiner—St. John Courtenay, III
(74) Attorney, Agent, or Firm—Scully, Scott, Murphy & Presser (57) ABSTRACT

Uniform access to and interchange between objects with use in any environment that supports interface composition through interface inheritance and implementation inheritance from a common base class is provided. Proxies are used to provide both cross-language and remote access to objects. The proxies and the local implementations for objects share a common set of interface base classes, so that the interface of a proxy for an object is indistinguishable from a similar interface of the actual implementation. Each proxy is taught how to deal with call paramters that are proxies of the other kind. A roster of language identifiers is developed, and a method is added to each object implementation which, when called, checks whether it matches the language that the object implementation is written in. If so, it returns a direct pointer to the object implementation. Common client coding can then be used to deal with both same language and cross-language calls.

7 Claims, 6 Drawing Sheets

UNIFORM ACCESS TO AND INTERCHANGE BETWEEN OBJECTS EMPLOYING A PLURALITY OF ACCESS METHODS

FIELD OF THE INVENTION

1. Technical Field

This invention relates generally to the field of multi-language, distributed programming environments, and provides, in particular, a mechanism for transparently issuing remote and local cross-language, and local same language calls from an object oriented environment.

2. Prior Art

Object oriented (OO) technology is significantly different, on design level, from the more conventional process-based technology. The latter is often called procedural technology, and programming in such technology generally results in hierarchies of nested computer programs or procedures.

By contrast, the focus of OO design is on how the problem can be broken down into a set of autonomous entities that can work together to provide a solution. The autonomous entities of OO technology are called objects.

Essentially, an object oriented program is created using a set of language tools, abstractions and constructs that support a particular form of user-defined types, called "classes". Each such type associates a collection of declared data with a set of operations on that data. Variables, or instances, of such types in the running programs are the objects.

Classes can be related to one another by inheritance. The properties, behaviours, data, and operations of a parent, or "base", class may be inherited without modification by some child, or "derived" class, or the behaviours, properties, and operations may be selectively refined under control of the programmer. When defining a derived class, one may start by building on an existing base class which is similar to the one to be created. The derived class inherits the implementation and behaviour of the base class, except as modified by amendments detailed in the derived class definition. Several classes can inherit the behaviours of a common parent, and a derived class may inherit from more than one base class.

A member function is a function or operation defined as a behaviour of some user-defined type where that type participates in a hierarchy of other types. Functions are not directly called out, but are invoked on an object.

Since the first development of OO technology concepts in the 1970's and the invention of the C++ programming language in the 1980's, OO programming languages have proliferated, many directed to specialty applications.

The concept of reusable objects has a number of advantages in terms reducing programming development time and cost. However, use of a specific OO programming language may have draw backs. For example, C++ lacks inherent concurrency.

This can be addressed in a distributed programming environment that provides the appearance of concurrency in performing multiple operations simultaneously. One system described in Canadian Patent Application No. 2,097,540 to IBM Canada Ltd., laid open Dec. 2, 1994, provides transparent access to data objects located in the memory address spaces of remote processors of the same type. The memory space of each of the multiple processors in the distributed environment is segmented; a data object is referenced at parallel segments in each processor. Where the data object resides in the local memory of a processor, the memory segment referencing it contains a variable record identifying its actual address in the processor's memory. Where the data object resides in the memory of a remote processor, the memory segment contains a variable record simply identifying the remote processor. The reference points directly to the parallel memory segment containing the data objects actual address in the remote processor. The application also describes a mechanism to handle data object migration within the processor cluster.

Another way to represent remote objects locally is through the use of "proxies". An early approach to the use of proxies is found in M. Shapiro, "Structure and Encapsulation of Distributed Systems: The Proxy Principle", Proceedings of Sixth International Conference of Distributed Computer Systems, May 1986, pp. 198–204, where proxies are described as being of the nature of "stubs" introduced as interfaces between clients and services.

Proxies are often used to allow access to remote objects transparently, so that the interface of the proxy that is accessible to the client is indistinguishable from a similar interface of the actual implementation. This "local-remote transparency" allows the use of a consistent programming style in the client, and permits common code to deal with both local and remote objects. IBM's DSOM and IONA Orbix, which conform to the Object Management Group's Common Object Request Broker Architecture (OMG CORBA), are examples of this use of proxies. These environments also offer symmetry, in that a mixture of implementations and proxies can exist on both sides of a remote connection. The use of proxies enables the support of complex interfaces involving complicated data types, exceptions, and inheritance.

In addition to the value added by distributed processing, access to functions provided in other programming languages can enhance the usability of object oriented languages such as C++. For example, the Java programming language provides a particularly useful format for Internet transmission, COBOL provides an efficient way to extract and combine fields from complex business records, etc.

Proxies are used to provide cross-language access to local objects. The TwinPeaks project at SunSoft and ILOG Corporations is developing a tool to construct a Java language proxy automatically from a C++ class declaration, although the result is not symmetric. Microsoft's COM and Java virtual machine technology provide a symmetric capability between C++ and Java, utilizing dynamically generated proxies on the Java side.

At present, there are no solutions that provide a combination of these features: remote access, transparency, symmetry, complex interfaces, and high-performance local cross-language access.

Remote technology can be used to achieve many of these features, for example by using a C++ Object Request Broker (ORB) in communication with a Java ORB, but can support only limited forms of a high-performance path for local cross-language use.

Microsoft Distributed COM has some similar capabilities. However its support for navigation among related interfaces is obtrusive, and expensive because it implies an interaction between a client and a, possibly remote, implementation. Local COM provides a high-performance local cross-language alternative, but it is not transparent because the data types handled are only a subset of those available in the distributed or cross-process case.

At present, no solution supports symmetric and transparent cross-language calls in a local or remote processing environment, with complex interfaces and inheritance, and a high-performance optimization of local access.

SUMMARY OF THE INVENTION

It is an object of the present invention to provide a uniform programming interface for remote and local cross-language, as well as for local same-language calls, while optimizing each one.

It is also an object of the present invention to provide a symmetric programming capability in which references to objects in a remote environment, local objects in one programming language environment, and local objects in a second programming language environment may be exchanged among the environments.

Accordingly, the present invention provides a method for constructing implementations and proxies, permitting a client to access an object directly, or through a proxy, without awareness on the part of the client as to which is used. This is achieved by providing, in a multi-language computing environment supporting interface composition through inheritance and implementation inheritance from common base classes, a mechanism to give apparently transparent access to objects.

The mechanism consists of a pure interface base class adapted to generate a hierarchy of pure interface classes containing only method implementations and instance data common to proxies and implementations, means for generating an implementation in response to a user access request on a local, same language implementation object, said implementation inheriting from the pure interface class hierarchy, and means to generate a first proxy object in response to a user access request on a cross-language implementation object, said first proxy object inheriting from the pure interface class hierarchy.

In addition, the present invention provides that the implementations and proxies so constructed support the composition of interfaces through inheritance, and the efficient navigation among related interfaces. This is achieved by providing means to generate target objects that present identical interfaces to the client in a distributed computing environment supporting interface composition through inheritance and implementation inheritance from common base classes in which target objects generated in response to user access requests include implementation objects in response to user access requests on local same-language implementation objects, proxy objects pointing to language-independent tokens in response to user access requests on local cross-language implementation objects and proxy objects having methods to encapsulate user requests as transmissible messages in response to user access requests on remote implementation objects.

The present invention also provides that multiple forms of proxies may be employed, each form suited to a particular circumstance encountered at execution time, including but not limited to one proxy form to access a remote object and a second proxy form to access a same-process object implemented in a different language. The appropriate proxy form is selected at the time of execution of the program, according to circumstances in effect at that time, and this is done without awareness on the part of the client as to which proxy form is used.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

The preferred embodiments of the present invention have been implemented in accordance with the Object Management Group's Common Object Request Broker Architecture (OMG CORBA). The detailed description that follows is expressed primarily in terms of support for the C++ programming language. However, from reviewing this disclosure, it will become clear to one skilled in the art that the present invention is useful in any object oriented programming architecture and language combination that supports interface composition through interface inheritance, and implementation inheritance from common base classes.

Figure 1:
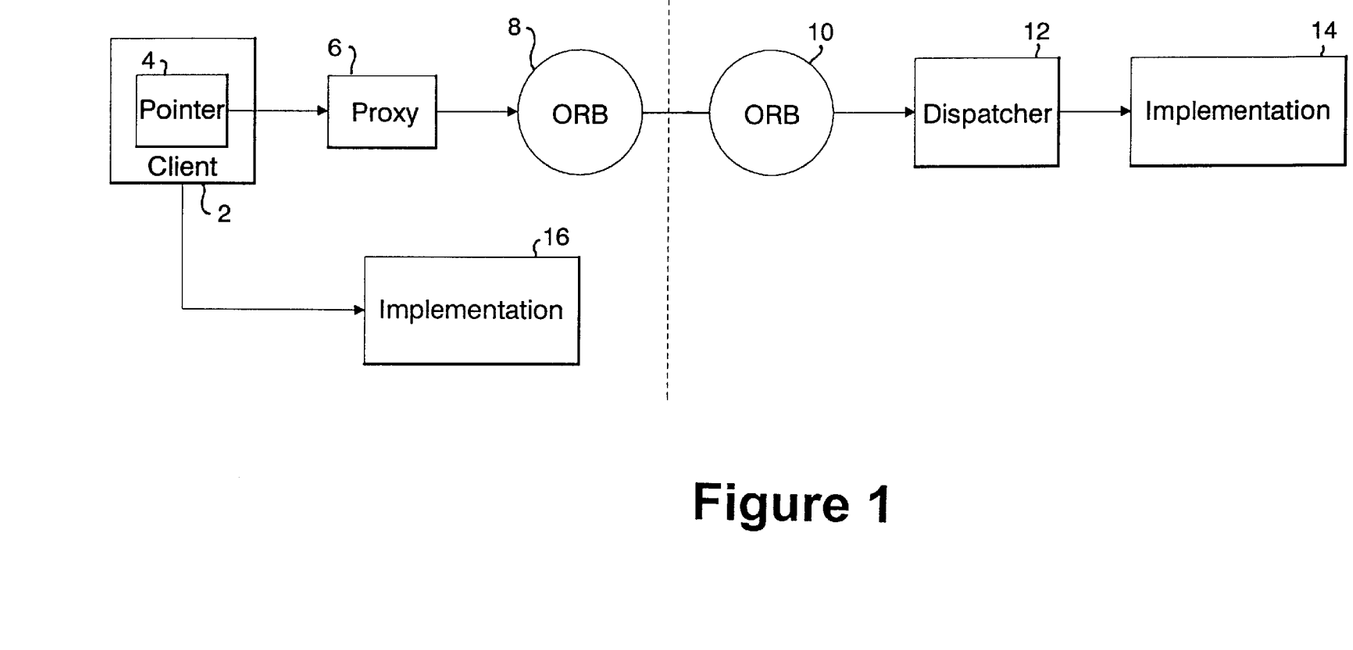
FIG. 1 is a schematic representation of method invocation on a remote object under the CORBA architecture (defined below)

The present state of the art of CORBA implementation in C++ is illustrated schematically in FIG. 1. C++ client 2 possesses a reference 4 (a C++ pointer) to a proxy object which presents to the client the same interface possessed by a remote object implementation 14. When the client invokes methods through the reference, methods in the proxy object are invoked. These proxy object methods make use of facilities provided by an Object Request Broker (ORB) 8 to encapsulate the method invocation as a transmissible message that is sent to a peer ORB 10. The peer ORB may execute in a different process on the same machine as the client, or in a different machine connected by a network. The peer ORB may also inhabit a different programming language environment.

The peer ORB passes the message to a Dispatcher 12, which uses facilities provided by the ORB to un-encapsulate the method invocation and then invokes the desired method directly on the object implementation 14. Result values and exceptions are collected by the Dispatcher and encapsulated in a reply message that is returned to the client ORB, and then through the proxy object back to the client program.

The client reference 4 may instead point directly to a C++ implementation 16 that is local to the client's machine. Because the interface presented by the implementation is indistinguishable from that presented by the proxy, the client program is unaware of whether the reference points directly to an implementation or to a proxy object. In this fashion the current state of the art provides transparency between local and remote objects.

CORBA defines an Interface Definition Language (IDL) that is used to define these interfaces without reference to a particular programming language. Transformation tools read an IDL definition and generate corresponding proxy class and Dispatcher definitions in a desired programming language, such as C++ or Java. CORBA specifies rules that define the correspondence for a number of programming languages.

Figure 2A:
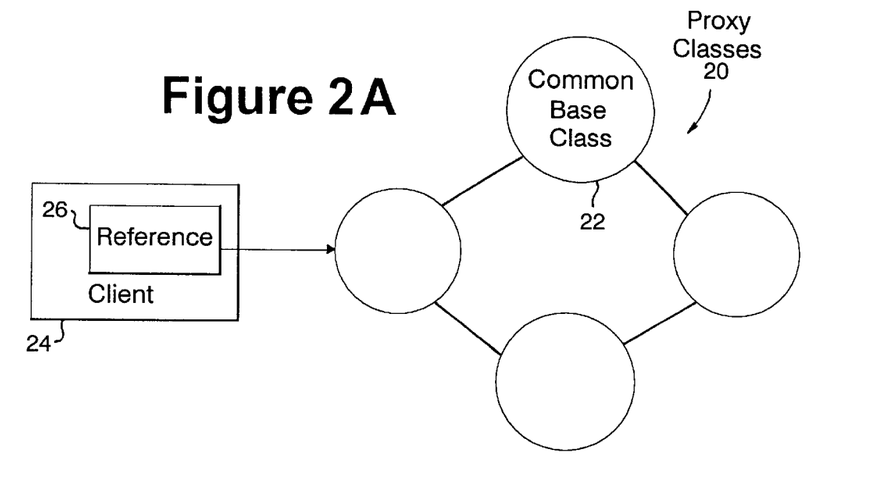
FIGS. 2A and 2B are schematic representations showing the structure of the class hierarchies presently used to provide local and remote object access under the CORBA architecture.

FIG. 2A is a diagram of the C++ class inheritance structure that supports this behaviour in the current practice.

A hierarchy of proxy classes 20 whose inheritance structure matches the inheritance structure of the IDL declarations is generated. Each proxy class provides C++ virtual functions At the base of the proxy class structure is a common base class 22 which contributes behaviour and instance data common to all proxy objects, and is necessary for the correct operation of the ORB. The client 24 may, by means of the reference 26 that it possesses, access the interface of a proxy class and of all the other proxy classes from which it inherits.

Figure 2B:
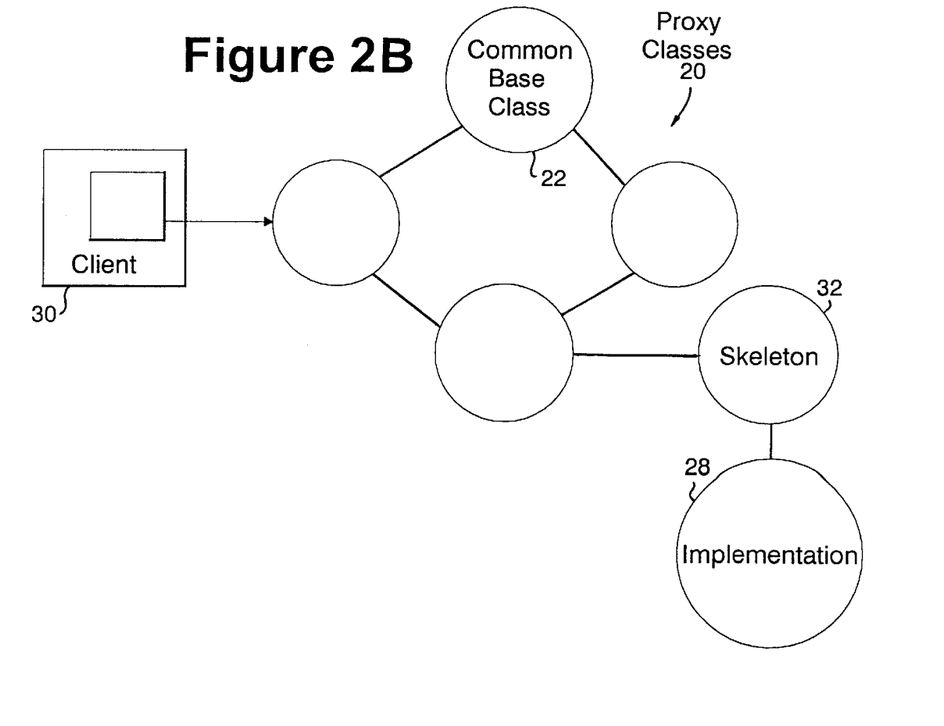

FIG. 2B illustrates how an implementation 28 may equally be the target of a reference. The implementation inherits from a C++ proxy class and overrides the methods provided in the proxy classes. When client 30 calls a method on this composite object, the C++ virtual function mechanism ensures that the override methods provided by the implementation are invoked in preference to the methods supplied by the proxy classes. The Skeleton class 32 helps provide the Dispatcher with capability for an ORB to use and is not relevant in the case where the client is local to the implementation.

The present invention improves on this structure by providing for multiple kinds of proxies each suited to a particular circumstance. Concurrently-filed application titled "Transparent Use Of Compiled or Interpreted Objects in an Object Oriented System" Ser. No. 09/074,222, which is commonly assigned, describes an inter-language call mechanism applicable within a single process. This mechanism has an efficiency advantage over the use of communicating ORBs, but utilizes different proxy classes and dispatchers than those used with an ORB.

Figure 3A:
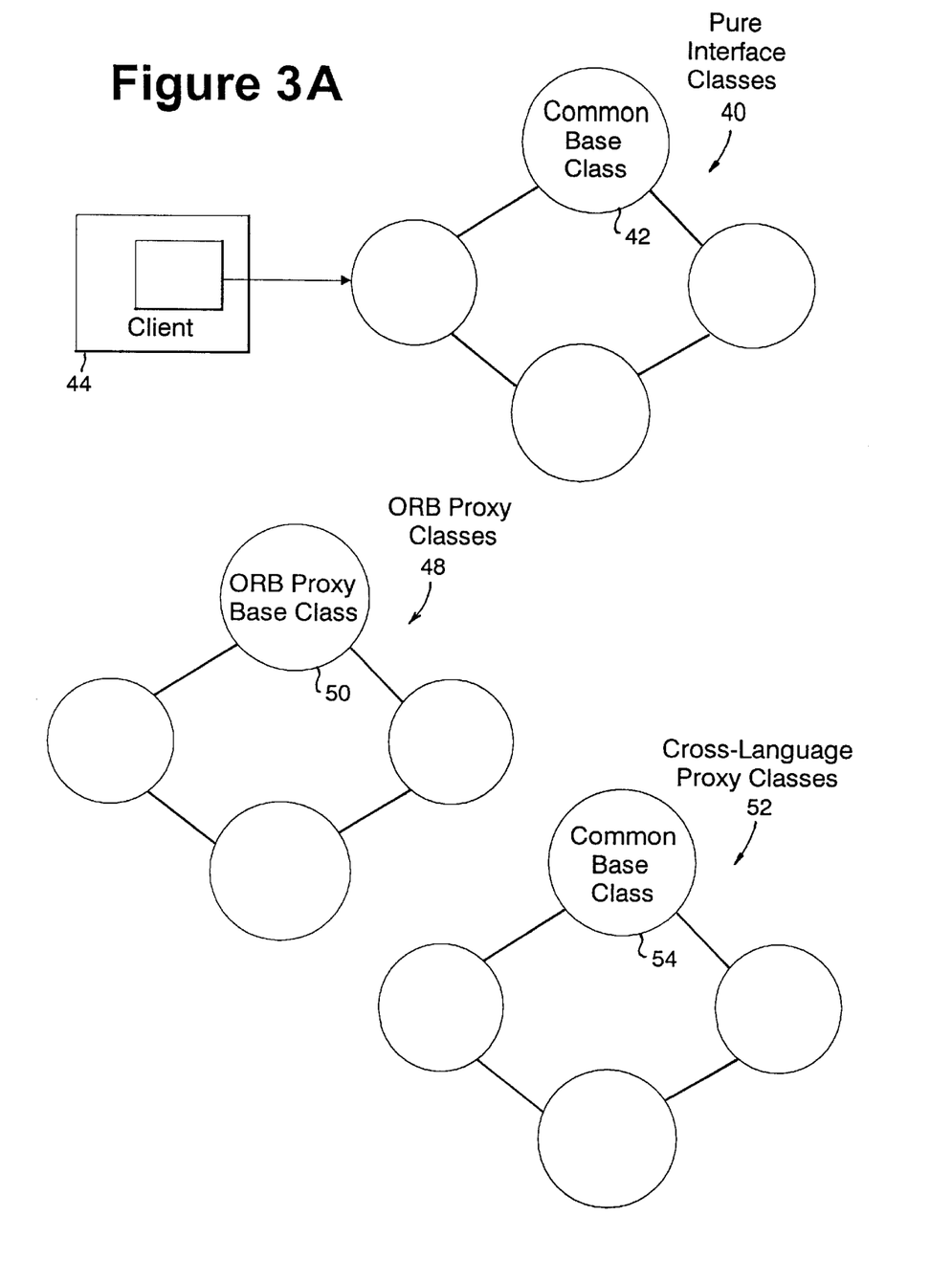
FIGS. 3A and 3B are schematic representations similar to FIG. 2 showing modification of the CORBA architecture according to the preferred embodiment of the invention.

The present invention restructures the class hierarchy as diagrammed in FIG. 3A. A hierarchy of pure interface classes 40 is generated that presents the same appearance to the client 44 as did the proxy class hierarchy of FIG. 2A, and introduces the same C++ virtual functions, but does not contain any method implementations whose function is specific to an ORB proxy. The pure interface classes, as well as their common base class 42, only contribute method implementations and instance data that are common to the different proxy kinds and implementations in use.

Parallel hierarchies of generated proxy classes 48 and 52 inherit from the pure interface class hierarchy and provide, by means of C++ virtual function overrides, implementations of the methods appropriate to different kinds of proxies. By way of example, class hierarchy 48 provides ORB proxy method implementations, and common ORB proxy base class 50 introduces instance data and common method implementations necessary for the proper operation of the ORB with this proxy object but not necessary for the proper operation of other proxy kinds. Class hierarchy 52 provides local cross-language proxy method implementations that make use of the run time facilities described in the above referenced application, "Transparent Use of Compiled or Interpreted Objects in an Object Oriented System", and its common base class 54 introduces instance data necessary for the proper operation of a local cross-language proxy but not necessary for the operation of other proxy kinds.

Figure 3B:
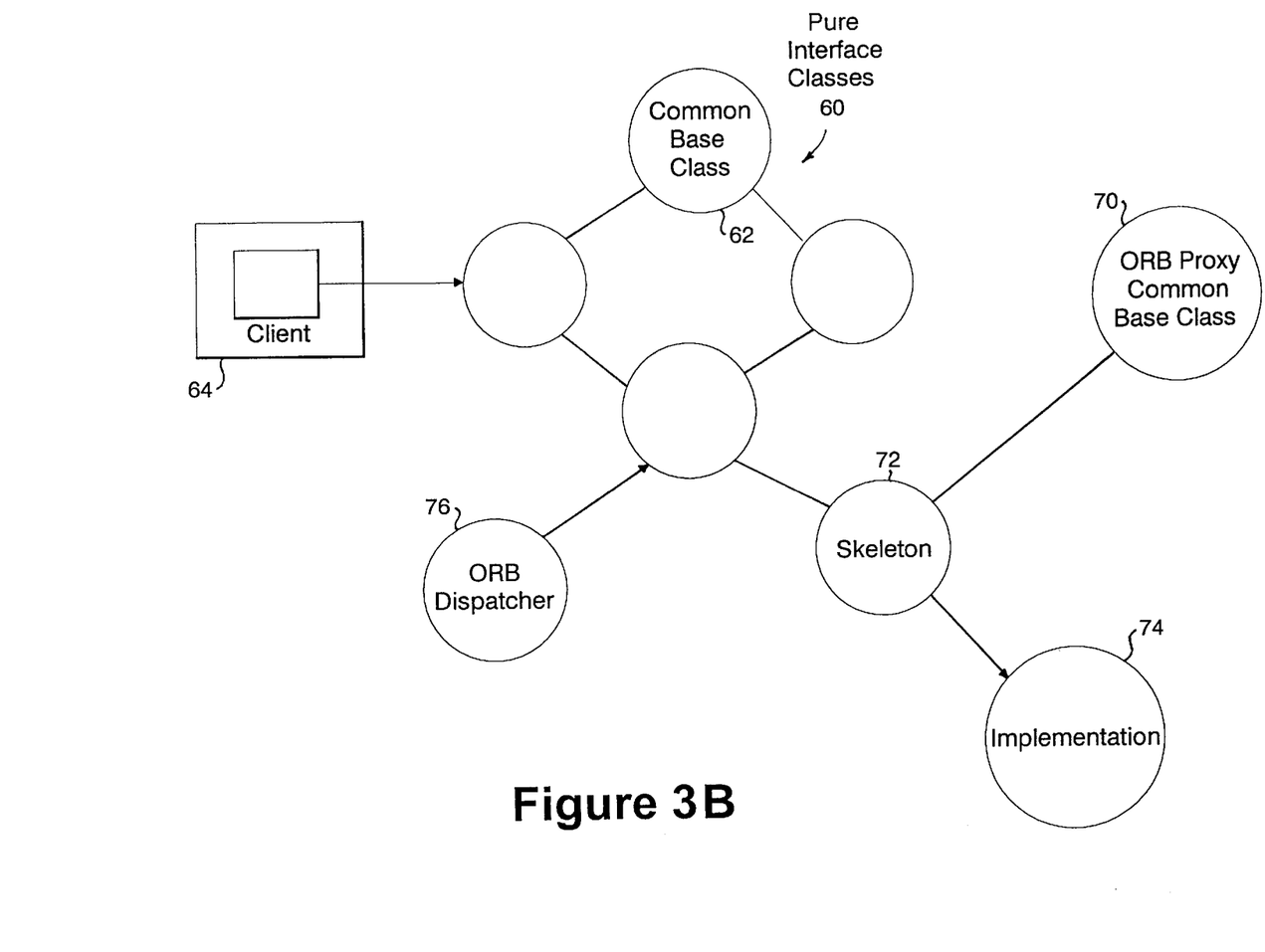

FIG. 3B illustrates the structure of implementations built using the class hierarchies of the present invention. The Implementation 74 inherits, through its Skeleton class 72, from a member of the pure interface hierarchy class 60. The Skeleton also inherits from the common base class 70 of the ORB proxy class hierarchy, which provides some common method implementations and instance data required for the ORB to interact correctly with this implementation.

An ORB Dispatcher object 76 is used by the ORB to invoke methods of the implementation when a request is received from a remote client 64. According to the present invention, the Dispatcher uses a reference into the pure interface class hierarchy in order to access the implementation, just as a client would do, and is able to invoke methods on any kind of object that inherits from the pure interface classes, including different kinds of implementation and even different kinds of proxies.

In the above described manner transparency is achieved, because a client reference refers to a member of the pure interface class hierarchy, that hierarchy being present in and common to all kinds of proxies and implementations, therefore a use of the client reference may invoke any kind of proxy or implementation.

Complex interfaces with inheritance are accommodated because the pure interface class hierarchy is constructed as interfaces related by inheritance, and it is common to all proxies and implementations.

Symmetry is provided by ensuring that the implementations of the proxy methods of each kind of proxy, and the instance data and implementation provided by the interface base class, function together in all desired usage combinations.

High performance optimization of local access is provided by supporting direct access to a local same-language implementation, a specialized proxy for access to a local different-language implementation, and a third ORB proxy for access to remote implementations.

The symmetry and high performance optimization aspects of the present invention will be further elaborated with respect to the preferred embodiment.

The environment in which the preferred embodiment of the present invention is employed includes the C++ and Java programming languages. The SOM technology described in the above referenced application, "Transparent Use of Compiled or Interpreted Objects in an Object Oriented System", involves a SOM Runtime component which, together with SOM proxies and Dispatchers, enables access from C++ to objects in the same process implemented in Java, and from Java to objects implemented in C++. The correct functioning of this technology depends on any objects which are to function as SOM proxies and implementations storing in their instance data an identifying token known as a SOMRef that is supplied by the SOM Runtime. In addition, the SOMRef stored within the object must be accessible to (other) SOM proxies and SOM dispatchers. Any object meeting this requirement is "SOM enabled".

Also present in the environment in which the preferred embodiment of the present intention is employed is an ORB which, together with ORB proxies and Dispatchers, makes C++ implementations accessible from remote clients and permits access in C++ to remote implementations. The correct functioning of this technology depends on objects storing in their instance data several ORB-specific data, and making these data available to ORB proxies and to the ORB itself. Any object meeting this requirement is "ORB enabled".

The environment of the preferred embodiment does not include an ORB that can be directly accessed from Java.

In this environment the symmetry requirement is that C++ implementations and ORB proxies may be passed into Java code and accessed from there, and that Java implementations may be passed into C++ and accessed from there.

Figure 4:
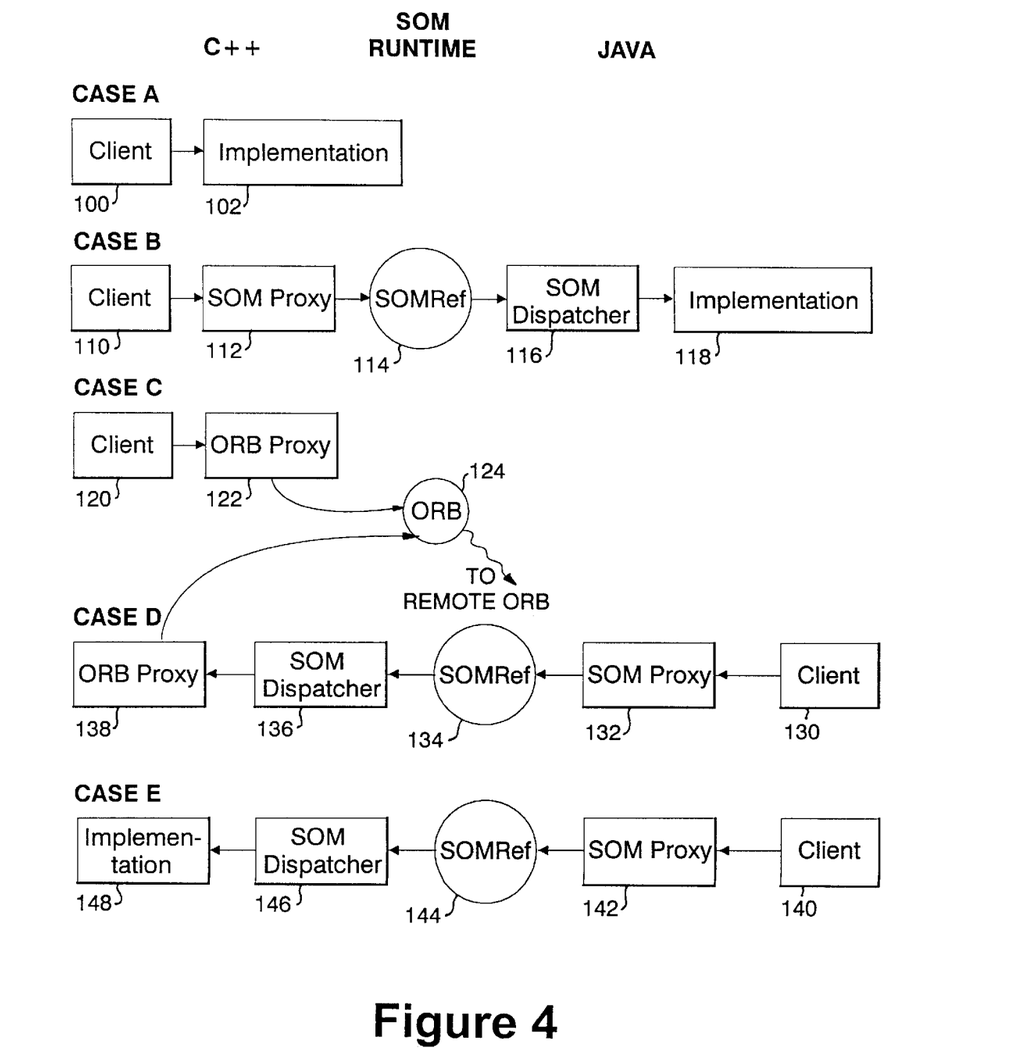
FIG. 4 is a series of 5 schematic representations, of the same type as FIG. 1, illustrating different types of access between objects in a mixed C++ and Java environment.

The high performance optimization requirement is expressed in terms of five cases that are illustrated in FIG. 4.

Case A: Direct access to an implementation shall be used whenever a client 100 and implementation 102 are local and in the same language.

Case B: A single C++ SOM proxy 112 and Java SOM dispatcher 116 shall be used whenever a C++ client 110 and a Java implementation 118 are local to one another. A language-independent SOMRef 114 is passed across the language environments.

Case C: A single C++ ORB Proxy 122 pointing to an ORB 124 shall be used when the client 120 is C++ and the implementation is remote.

Case D: A tandem composition of a Java SOM proxy 132, C++ SOM dispatcher 136, and C++ ORB proxy 138 shall be used when the client 130 is Java and the implementation is remote. A language-independent SOMRef 134 is again passed across the languages.

Case E: A single Java SOM proxy 142 and C++ SOM dispatcher 146 (through SOMRef 144) shall be used whenever a Java client 140 and a C++ implementation 148 are local to one another.

Figure 5:
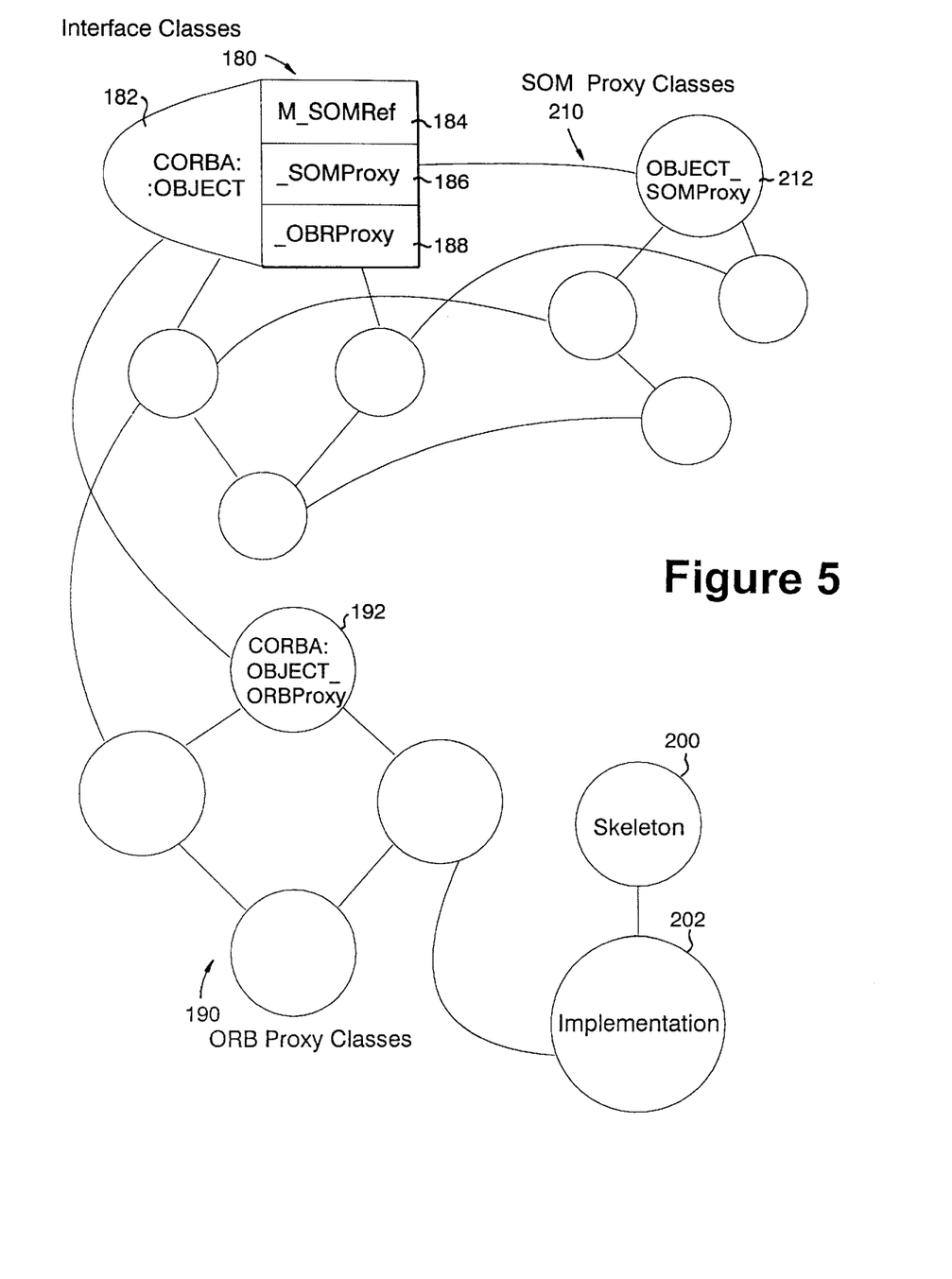
FIG. 5 is a schematic representation of the class hierarchy structure to implement the different types of access in FIG. 4.

FIG. 5 schematically illustrates the C++ class inheritance structure pursuant to the present invention which satisfies these requirements. A set of interface classes 180 is generated from IDL describing the interfaces desired by the user. These generated interface classes inherit from the common interface base class 182, which in the preferred embodiment is the CORBA::Object class. In this class are introduced instance data and methods that are common to all proxies and implementations. In particular, the instance datum "m_somref" 184 is introduced here, as are the methods "_SOMProxy ( )" 186 and "_ORBProxy( )" 188 which return pointer values. Default implementations of the methods are supplied that return null pointers.

A set of ORB proxy classes 190 is also generated, each proxy class of which inherits from a corresponding member of the set of interface classes. The generated ORB proxy classes also inherit from a common ORB proxy base class 192, which in the preferred embodiment is the CORBA::Object_ORBProxy class. In the common ORB proxy base class are introduced the instance data and methods that are common to ORB proxies and ORB-accessible implementations, the inclusion of which renders an object ORB enabled. The ORB proxy base class also overrides the "_ORBProxy( )" method and causes that method to return a pointer to the ORB proxy base class, instead of a null pointer.

ORB proxies are instances of an ORB proxy class, and therefore contain the "m_somref" instance data 184 and the "_SOMProxy( )" and "_ORBProxy( )" methods 186, 188 introduced by the common interface base class 182. The instance data 184 is directly accessible to SOM proxies and dispatchers, and therefore an ORB proxy is SOM-enabled. This satisfies Case D of FIG. 4.

A Skeleton class 200 is also generated, that inherits from the interface class hierarchy and from the ORB proxy base class. A C++ Implementation class 202, constructed by the user, inherits from this class.

C++ implementations are instances of a C++ implementation class, and therefore contain the "m_somref" instance data 184 and the "_SOMProxy( )" and "_ORBProxy( )" methods 186, 188 introduced by the common interface base class 182. The instance data is directly accessible to SOM proxies and dispatchers, thereby SOM-enabling a C++ implementation. This satisfies Case E of FIG. 4.

As the C++ Implementation class 202 also inherits from the ORB Proxy base class 192, the C++ implementation also contains all the instance data and methods introduced by that class sufficient to allow the correct operation of the ORB and ORB proxies and ORB dispatchers. The ORB, ORB proxies, and ORB dispatchers access this data indirectly by first calling the _ORBProxy( ) method of the object, which returns a pointer to the ORB proxy base class portion of the object, and then accessing the data directly using the returned pointer. By this mechanism, a C++ implementation is also ORB enabled. This satisfies Case C of FIG. 4.

As the C++ Implementation class 202 also inherits from the generated interface base class hierarchy, it may be directly referenced by a C++ client. This satisfies Case A of FIG. 4.

A set of SOM proxy classes 210 is also generated, each proxy class of which inherits from a corresponding member of the set of interface classes 180. The generated SOM proxy classes also inherit from a common SOM proxy base class 212, which in the preferred embodiment is the Object_SOMProxy class. The SOM proxy base class overrides the "_SOMProxy( )" method and causes it to return a pointer to the SOM proxy base class, intstead of a null pointer. This satisfies Case B of FIG. 4.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by letters patent is:

1. A mechanism for providing a client access to implementation objects in a multi-language computing environment supporting interface composition through inheritance and implementation inheritance from common base classes, said mechanism comprising:

a pure interface base class adapted for generating a hierarchy of pure interface classes containing only method implementations and instance data common to proxies and implementations;

a means for directly accessing an implementation object in response to a user access request on a local same-language implementation object, said implementation inheriting from the pure interface class hierarchy; and a means for generating a first proxy object in response to a user access request on a local cross-language implementation object, said first proxy object inheriting from the pure interface class hierarchy;

wherein said mechanism provides said client with apparently transparent access to said implementation objects.

2. The mechanism according to claim 1, further comprising a means for generating a language-independent token representing a cross-language implementation object where the user access request is to a local cross-language implementation object;

wherein the means for generating the first proxy object is adapted for providing in said first proxy, a pointer to said token.

3. The mechanism according to claim 1, further comprising a means for generating a broker object having methods for encapsulating the user access request as a transmissible message where the user access request is to a remote implementation object;

wherein the means for generating the first proxy object is adapted for providing in said first proxy, a pointer to said broker object.

4. The mechanism according to claim 1, wherein the pure interface base class is further adapted for generating in said hierarchy of pure interface classes, at least one class containing instance data to refer to a language-independent token representing a cross-language implementation object.

5. The mechanism according to claim 1, wherein the pure interface base class is further adapted for generating in said hierarchy of pure interface classes, at least one class containing method implementations for encapsulating the user access request as a transmissible message.

6. A mechanism for providing a client access to implementation objects in a distributed computing environment supporting interface composition through inheritance and implementation inheritance from common base classes, said mechanism comprising:

a means for directly accessing implementation objects in response to user access requests on local same-language implementation objects;

a means for generating proxy objects pointing to language-independent tokens representing cross-language implementation objects in response to user access requests on local cross-language implementation objects;

a means for generating proxy objects having methods for encapsulating user access requests as transmissible messages in response to user access requests on remote implementation objects;

each said directly accessing and each said generating means presenting identical interfaces to the client to thereby provide said client with apparently transparent access to said implementation objects.

7. The mechanism according to claim 6, each said directly accessing means and each said generating means further comprising:

a pure interface base class adapted for generating a hierarchy of pure interface classes containing only method implementations and instance data common to proxy objects and implementation objects.

* * * * *